(12) United States Patent
Chun

(10) Patent No.: US 9,619,981 B2
(45) Date of Patent: Apr. 11, 2017

(54) HAPTIC ACTUATOR

(71) Applicant: HYSONIC. CO., LTD., Ansan-si (KR)

(72) Inventor: Se Jun Chun, Ansan-si (KR)

(73) Assignee: HYSONIC. CO., LTD., Ansan-si (KR)

( * ) Notice: Subject to any disclaimer, the term of this patent is extended or adjusted under 35 U.S.C. 154(b) by 0 days.

(21) Appl. No.: 14/779,683

(22) PCT Filed: Jul. 18, 2014

(86) PCT No.: PCT/KR2014/006561
§ 371 (c)(1),
(2) Date: Sep. 24, 2015

(87) PCT Pub. No.: WO2015/068930
PCT Pub. Date: May 14, 2015

(65) Prior Publication Data
US 2016/0247368 A1    Aug. 25, 2016

(30) Foreign Application Priority Data

Nov. 5, 2013 (KR) .................. 10-2013-0133454

(51) Int. Cl.
*G08B 6/00* (2006.01)
*H02K 33/16* (2006.01)
(52) U.S. Cl.
CPC .............. *G08B 6/00* (2013.01); *H02K 33/16* (2013.01)
(58) Field of Classification Search
CPC ........ H02K 33/12; H02K 33/00; H02K 33/02; H02K 33/06; H02K 33/10; H02K 33/14;
(Continued)

(56) References Cited

U.S. PATENT DOCUMENTS

2005/0001703 A1* 1/2005 Zimmerling ............ B06B 1/045
335/220
2007/0207672 A1* 9/2007 Takagi .................... B06B 1/045
439/607.01
(Continued)

FOREIGN PATENT DOCUMENTS

JP       2010178419      8/2010
KR       101055562       8/2011
(Continued)

OTHER PUBLICATIONS

International Search Report—PCT/KR2014/006561 dated Nov. 14, 2014.

*Primary Examiner* — Van Trieu
(74) *Attorney, Agent, or Firm* — Cantor Colburn LLP

(57) ABSTRACT

A haptic actuator more improved performance in response speed, frequency band, etc according to touch of user by improving magnetic force structure, comprises a case having an accommodation space therein; a core fixedly mounted in the accommodation space; a first coil member and a second coil member mounted on the outside of the core to be vertically spaced apart each other; a center yoke disposed between the first coil member and the second coil member and mounted on the outside of the core; a magnet disposed on the outside of the center yoke; a weight fixedly mounted on the outside of the magnet; a first elastic member having an end fixed to the magnet and the weight, and an opposite end fixed to the upper of the case and elastically supporting the magnet and the weight.

6 Claims, 6 Drawing Sheets

(58) Field of Classification Search
CPC ........ H02K 33/16; H02K 33/18; B60B 1/045; G08B 6/00
See application file for complete search history.

(56) References Cited

U.S. PATENT DOCUMENTS

| | | | |
|---|---|---|---|
| 2010/0102646 A1* | 4/2010 | Masami | H02K 33/16 310/29 |
| 2011/0198949 A1* | 8/2011 | Furuich | H02K 33/16 310/25 |

FOREIGN PATENT DOCUMENTS

| | | |
|---|---|---|
| KR | 1020120054685 | 5/2012 |
| KR | 1020120139524 | 12/2012 |
| KR | 101250288 | 4/2013 |
| KR | 101254211 | 4/2013 |
| KR | 101265452 | 5/2013 |
| KR | 1020130120040 | 11/2013 |

\* cited by examiner

HAPTIC ACTUATOR

TECHNICAL FIELD

The present invention relates to a haptic actuator, and more particularly, to a haptic actuator being installed in an electronic device such as portable terminal etc. which needs vibration response by touch and generating vibration by interaction between a coil and a magnet.

BACKGROUND ART

Generally bell sound and vibration are well used for the receipt of communication device. For the vibration, it is a general case that a whole device is able to vibrate by actuating a small vibration generation device and subsequently transferring a actuating force to a case of the device.

Currently, the vibration generation device which is one of the receipt means applied in the communication device such as a cell phone is a component converting electric energy into mechanical vibration by using the generating principle of electromagnetic force and the vibration generation device is installed in a cell phone and is used for silent notice of the receipt.

The vibration generation device is widely used for the purpose of the notice of receipt of the cell phone or the like, and recently the use of vibration generation device is increased as follows, the vibration generation device is installed in a game device in order to inform user thereof of the game progress conditions or the vibration generation device is installed in a touch phone or the like in order for user thereof to know feeling that keys thereof were touched.

The need for product development of a new structure is rising which the drawback of the existing product of the vibration generation device is avoided and its quality is dramatically improved in the state expecting miniaturization and high qualification of the cell phone component following the trend that the cell phone market has been quickly expanded and moreover multi-functions are added to the cell phone.

The vibration generation device of the prior art mounted on the portable terminal as a vibration generation device basically using the secondary vibration system attaches a weight to an elastic body such as a spring and has a coil to vibrate the weight.

The weight vibrates depending on the frequency response characteristics predetermined by the weight and a modulus of elasticity of the elastic body when current is applied to the coil.

As described above, recently the portable terminal launched has a function providing feedback to user which corresponds to input, by outputting voice or vibration response to the user's touch input.

Particularly, in case of the portable terminal applied a haptic technology, the research of the vibration generation device generating the various types of vibrations in order to provide a various of haptic feedback in response to user's various input is underway.

The vibration generation device of the prior art, however, generates a vertical actuating power of the weight using Lorentz force between a coil and a fixed magnet, wherein it is difficult to get good characteristics in vibration strength and vibration frequency band, etc. because of limitation of a structure of the vibration generation device by means of Lorentz force.

Particularly, in the vibration generation device of LRA (Linear Resonant Actuator) method or Linear Motor of the prior art, there was a problem that the response speed is not fast because there is a limit to the increase in damping value.

PRIOR ART DOCUMENTS

1. Korean patent no. 10-1250288
2. Korean patent no. 10-1055562

DISCLOSURE

Technical Problem

The present invention has been made in an effort to solve the above-described problems, and it is an object of the present invention to provide a haptic actuator having more improved performance in response speed, frequency band, or the like according to touch of user by improving magnetic force structure.

Technical Solution

In order to achieve the object, an haptic actuator of the present invention comprises a case having an accommodation space therein; a core fixedly mounted in the accommodation space; a first coil member and a second coil member mounted on the outside of the core to be vertically spaced apart each other; a center yoke disposed between the first coil member and the second coil member and mounted on the outside of the core; a magnet disposed on the outside of the center yoke; a weight fixedly mounted on the outside of the magnet; a first elastic member having an end fixed to the magnet and the weight, and an opposite end fixed to the upper of the case and elastically supporting the magnet and the weight.

The first coil member and the second coil member are wound in opposite directions each other, and the magnet has polarity formed in the vertical direction and thickness being thicker than that of the center yoke.

The haptic actuator further comprises a first auxiliary yoke mounted on the upper end of the first coil member; and a second auxiliary yoke mounted on the outer end of the second coil member.

The thickness of the first auxiliary yoke and the second auxiliary yoke is thinner than that of the center yoke.

The haptic actuator further comprises a first cushion member disposed in the accommodation space and fixedly mounted on the upper of the case; and a second cushion member disposed in the accommodation space and fixedly mounted on the lower of the case.

The haptic actuator further comprises a second elastic member having an end fixed to lower ends of the magnet and the weight and an opposite end fixed to the lower of the case and elastically supporting the magnet and the weight.

The difference of the magnetic force N of the magnet from the elastic force N of the first elastic member is less than +/−1.

The core has a cylindrical shaft shape, the first coil member and the second coil member is wound on an outer circumference surface of the core around the core, the center yoke has a ring shape and mounted to surround the outer circumference surface of the core, the magnet and the weight has a ring shape and disposed to surround the outer circumference surface of the core.

Advantageous Effects

A haptic actuator of the present invention as described above has an effect as follows:

The performance in frequency band, etc, is improved and its response speed is faster than that of the prior art by the structure of the magnetic force lines formed by the magnet 600, the core 200, the center yoke 400, the first auxiliary yoke 510 and the second auxiliary yoke 520.

Further, by being the response speed of the haptic actuator faster, the output corresponding to various pattern of input signal in the portable terminal to which the haptic actuator is employed is promptly generated and transferred, thereby its quality and performance is improved.

Since the first cushion member and the second cushion member is mounted on the upper and lower of the case respectively, they reduce the generation of noise by playing a role as a sound-absorbing material at the time of collision of the magnet and the weight, generate repulsive force, and increase vibration acceleration.

DESCRIPTION OF DRAWINGS

The above and other objects, features and advantages of the present invention will become apparent from the following description of preferred embodiments given in conjunction with the accompanying drawings, in which.

BEST MODE

Figure 1:
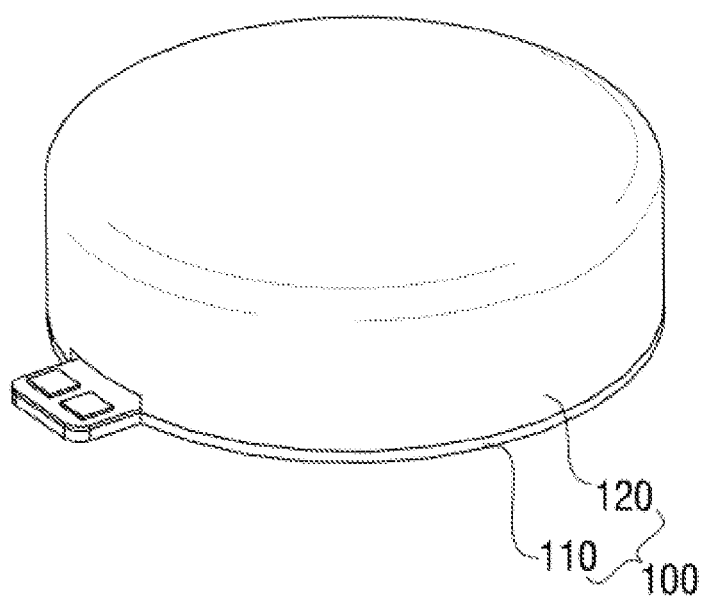
FIG. 1 is a perspective view illustrating a haptic actuator according to an embodiment of the present invention.
Figure 2:
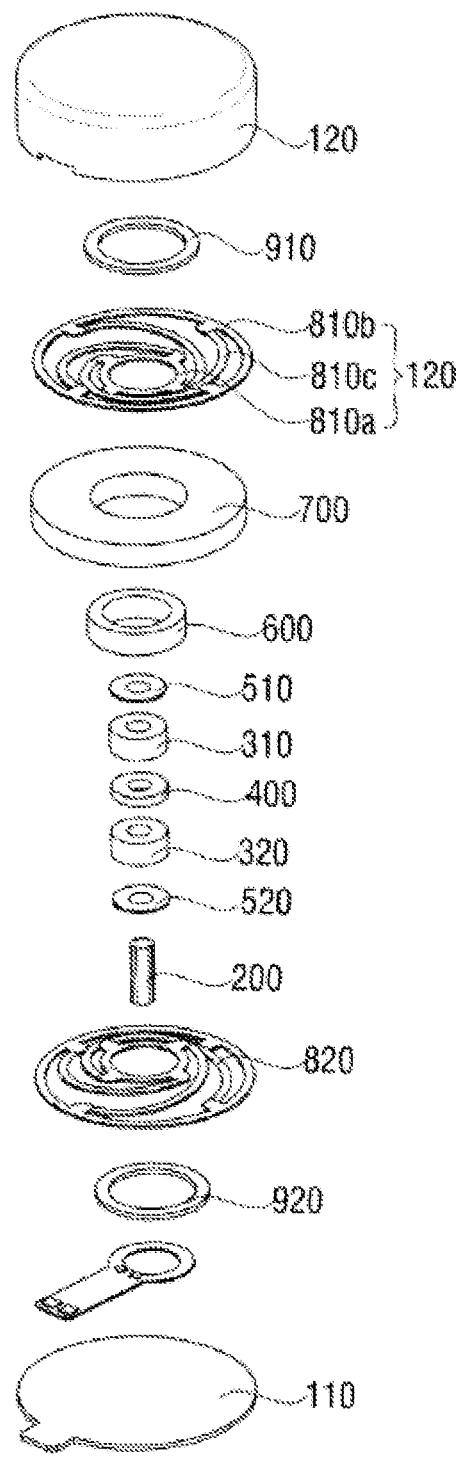
FIG. 2 is an exploded perspective view illustrating a haptic actuator according to an embodiment of the present invention.
Figure 3:
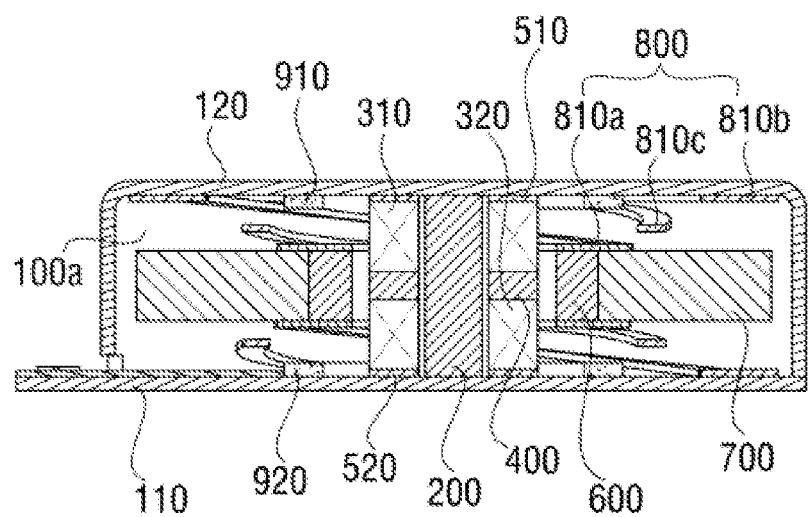
FIG. 3 is a sectional view taken along a line A-A in FIG. 1.
Figure 4:
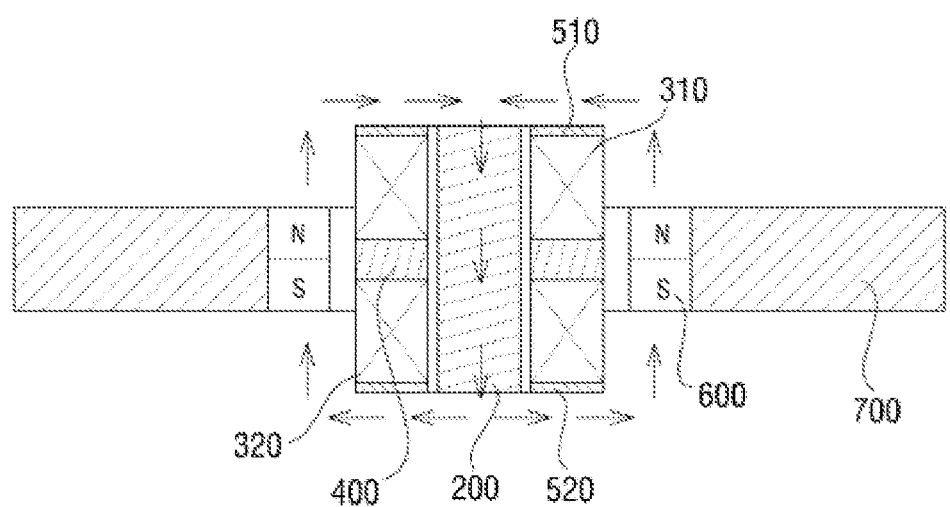
FIG. 4 is a view illustrating a structure of magnetic field lines of the initial state of a haptic actuator according to an embodiment of the present invention.
Figure 5:
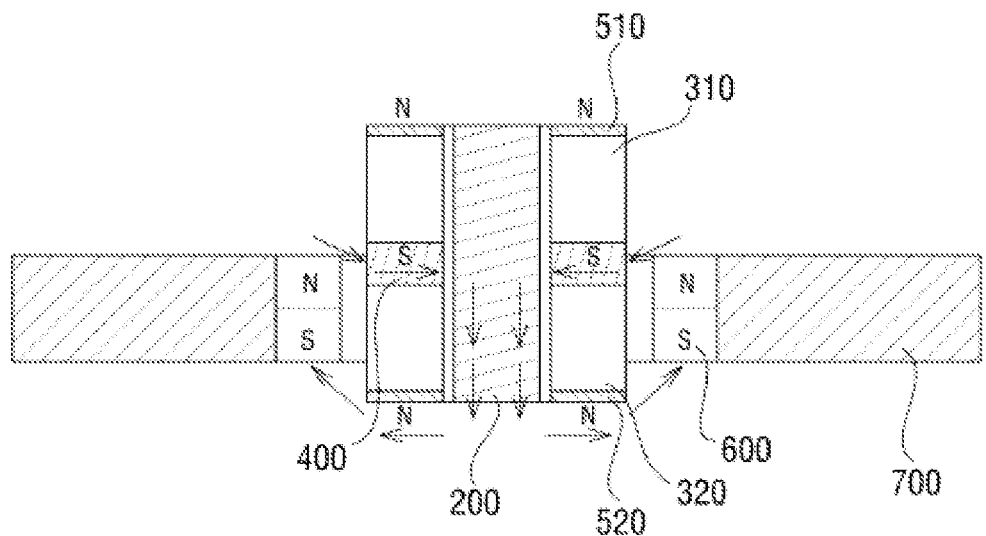
FIG. 5 is a view illustrating a structure of magnetic field lines at the time of descending of a haptic actuator according to an embodiment of the present invention.
Figure 6:
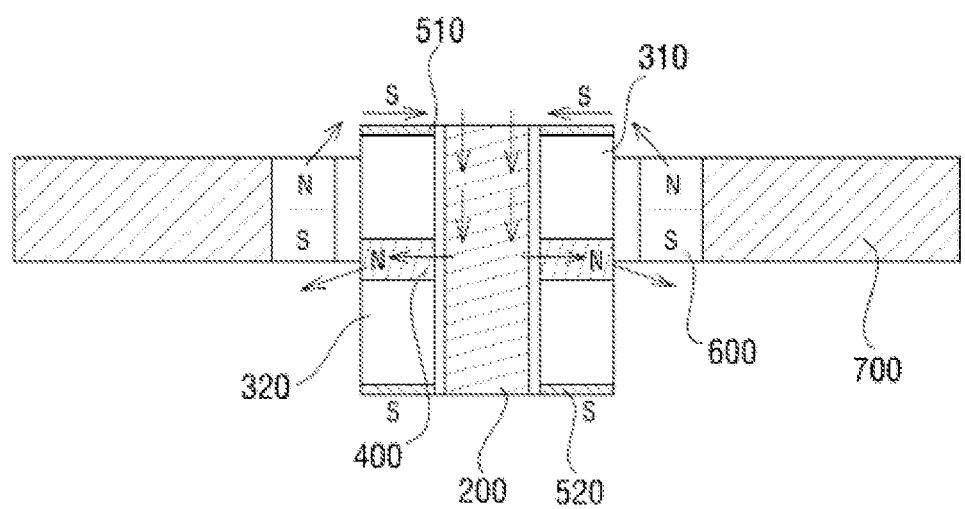
FIG. 6 is a view illustrating a structure of magnetic field lines at the time of ascending of a haptic actuator according to an embodiment of the present invention.
Figure 7:
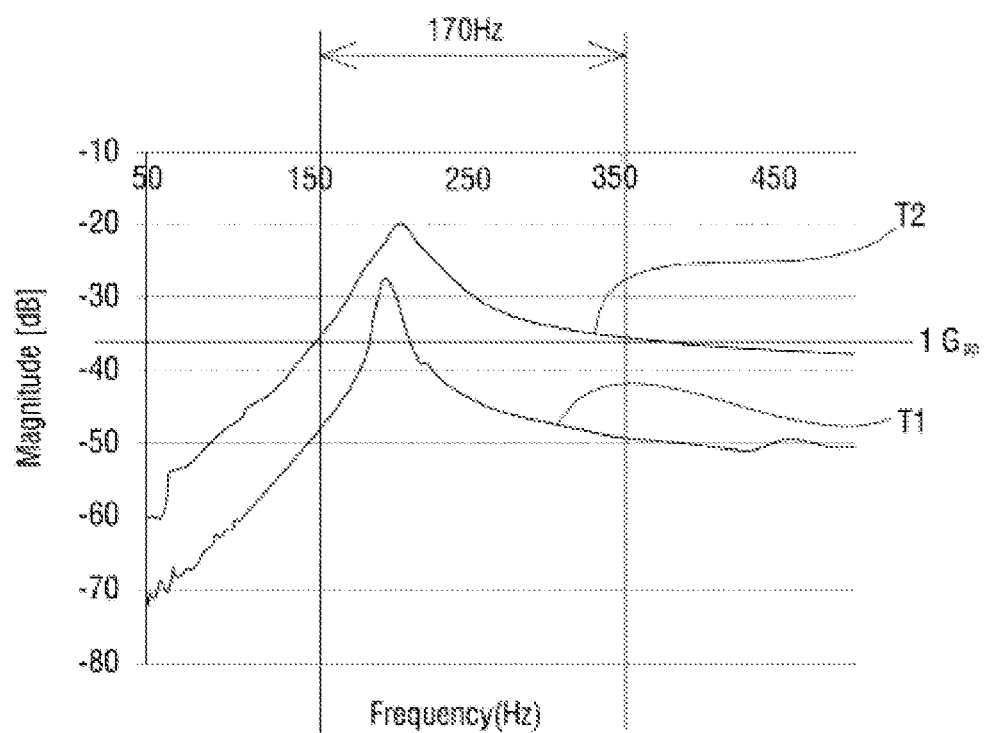
FIG. 7 is a data illustrating comparison of the performance of a haptic actuator according to an embodiment of the present invention with that of the vibration motor according to the prior art.
Figure 8:
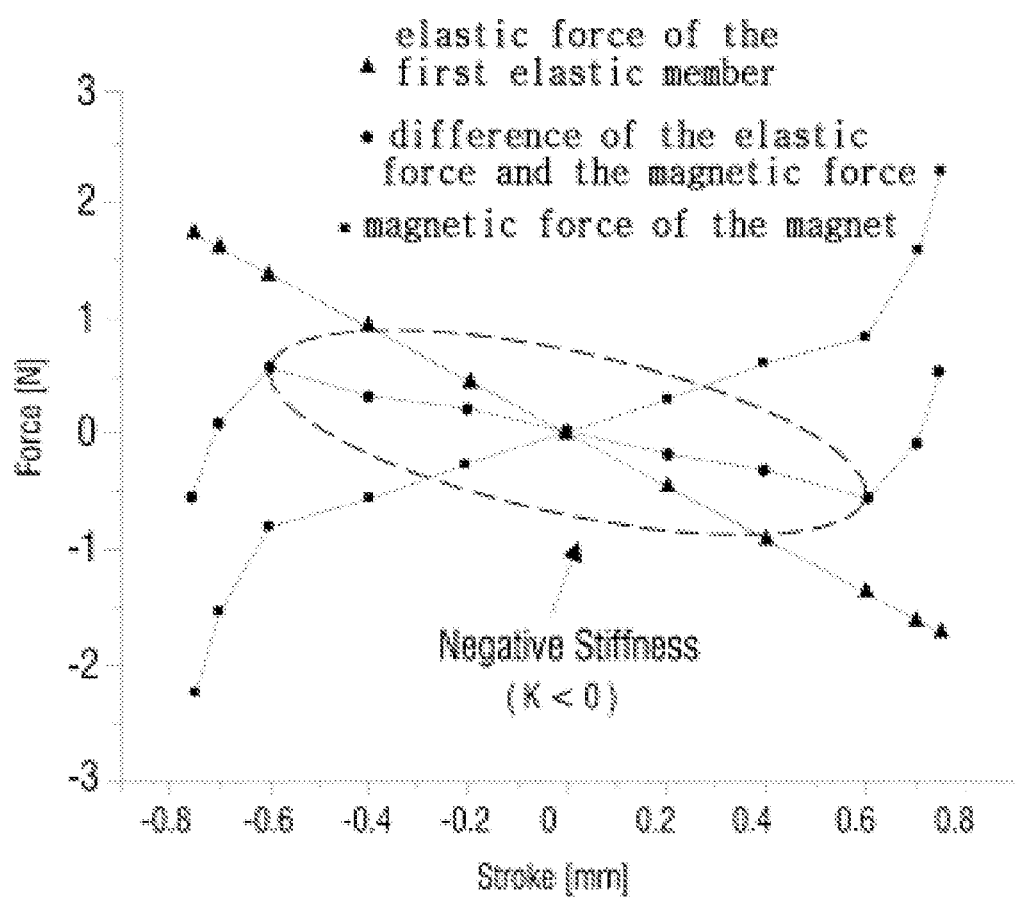
FIG. 8 is a graph illustrating comparison of the magnetic force the magnet of a haptic actuator according to an embodiment of the present invention with the elastic force of the elastic member.

FIG. 1 is a perspective view illustrating a haptic actuator according to an embodiment of the present invention, FIG. 2 is an exploded perspective view illustrating a haptic actuator according to an embodiment of the present invention, FIG. 3 is a sectional view taken along a line A-A in FIG. 1, FIG. 4 is a view illustrating a structure of magnetic field lines of the initial state of a haptic actuator according to an embodiment of the present invention, FIG. 5 is a view illustrating a structure of magnetic field lines at the time of descending of a haptic actuator according to an embodiment of the present invention, FIG. 6 is a view illustrating a structure of magnetic field lines at the time of ascending of a haptic actuator according to an embodiment of the present invention, FIG. 7 is a data illustrating comparison of the performance of a haptic actuator according to an embodiment of the present invention with that of the vibration motor according to the prior art, and FIG. 8 is a graph illustrating comparison of the magnetic force the magnet of a haptic actuator according to an embodiment of the present invention with the elastic force of the elastic member.

As shown in FIG. 1 to FIG. 6, a haptic actuator according to an embodiment of the present invention includes a case 100, a core 200, a first coil member 310, a second coil member 320, a center yoke 400, a first auxiliary yoke 510, a second auxiliary yoke 520, a magnet 600, a weight 700, a first elastic member 810, a second elastic member 820, a first cushion member 910 and a second cushion member 920.

The case 100 has a substantially cylindrical shape and has an accommodation space 100a therein, and specifically includes a bottom plate 110 and a cover 120.

The bottom plate 110 has a substantially circular plate-like shape and is made of a SPCC material which has ferromagnetic.

The cover 120 is made of a SPCC material which has ferromagnetic and has a bottom-opened cylindrical shape and is placed on the upper portion of the bottom plate 110 and has the accommodation space 100a of a cylindrical shape therein as described above.

Meanwhile, if the first auxiliary yoke 510 and the second auxiliary yoke 520 as will be described later are not used, the bottom plate 110 and the cover 120 should be made of a ferromagnetic, but if the first auxiliary yoke 510 and the second auxiliary yoke 520 are used, the bottom plate 110 and the cover 120 may be made of a non-ferromagnetic body, i.e. SUS material, etc.

The core 200 has a vertically long cylindrical shaft shape and is made of a ferromagnetic material, specifically SPCC material.

The core 200 is placed inside of the case 100, i.e. a center portion of the accommodation space 100a and the upper end and the bottom end of the core are fixed to the case 100 respectively.

Further, the core 200 is magnetized when a power is applied to the first coil member 310 and the second coil member 320 as will be described later and strong magnetic field is formed around of the core.

The first coil member 310 and the second coil member 320 include an enameled wire and has a shape cylindrically wound around the core 200, wherein the first coil member 310 and the second coil member 320 are wound each other in the opposite directions.

Further, the first coil member 310 is placed on the upper of the core 200 and the second coil member 320 is placed on the lower of the core 200, wherein the first coil member 310 and the second coil member 320 are spaced apart from each other with a predetermined internal in the vertical direction.

In other words, the first coil member 310 is wound clockwise on the upper end of outer circumference surface of the core 200 and the second coil member 320 is wound counterclockwise on the lower end of outer circumference surface of the core 200.

Meanwhile, the center yoke 400 is made of a ferromagnetic body, specifically SPCC material and the diameter of the center yoke has a cylindrical shape which is the same as that of the first coil member 310 and the second coil member 320 and the center yoke is placed between the first coil member 310 and the second coil member 320.

In other words, the center yoke 400 is placed in the center of the core 200 in the vertical direction and surrounds the outer circumference surface of the core 200.

The center yoke 400 induces a magnetic field to move the magnet 600 in the vertical direction when a current is applies to the first coil member 310 and the second coil member 320.

Meanwhile, on the upper of the first coil member 310, a first auxiliary yoke 510 is provided, on the lower of the second coil member 320, the second auxiliary yoke 520 is provided.

The first auxiliary yoke 510 and the second auxiliary yoke 520 are made of SPCC material and the diameters of the first auxiliary yoke and the second auxiliary yoke have cylindrical shapes which are the same as those of the first coil member 310 and the second coil member 320 and thickness of the first auxiliary yoke 510 and the second auxiliary yoke 520 is thinner than that of the center yoke 400.

In some cases, it may be possible to be made without the first auxiliary yoke 510 and the second auxiliary yoke 520, wherein a thickness of the first coil member 310 and the second coil member 320 is increased up to a thickness of the first auxiliary yoke 510 and the second auxiliary yoke 520 and materials of the bottom plate 110 and the cover 120 should be made of a ferromagnetic body.

As such, in the upper of the first coil member 310 and the lower of the second coil member 320 the first auxiliary yoke 510 and the second auxiliary yoke 520 is provided respectively, thereby generating an effect of increasing the actuating force by inducing a magnetic field in order to move the magnet 600 in the vertical direction when a current is applied to the first coil member 310 and the second coil member 320.

Further, the core 200, the center yoke 400, the first auxiliary yoke 510 and the second auxiliary yoke 520 may be formed integrally because they are made of same material.

Meanwhile, the magnet 600 has a ring shape of which the inner diameter is greater than the outer diameter of the center yoke 400 and surrounds the outside of the center yoke 400.

The magnet 600 has polarity which is formed in the vertical direction. That is, N pole is formed in an upper of the magnet and S pole is formed in a lower of the magnet.

Naturally, in some case, the polarity of the magnet 600 may be formed conversely.

In other words, the upper of the magnet 600 may be formed as S pole and a lower of the magnet may be formed as N pole, in this case, the first coil member 310 and the second coil member 320 are wound in the opposite direction.

As shown in FIG. 4, a magnetic field generating from the magnet 600 is induced by the core 200, the first auxiliary yoke 510, and the second auxiliary yoke 520 and, thereby generating strong magnetic force lines.

Further, a thickness of the magnet 600 is thicker than that of the center yoke 400, and an air gap portion of the magnet 600 is placed to be matched to that of the center yoke 400 before a current is applied to the first coil member 310 and the second coil member 320 that is, at the initial state.

The weight 700 surrounds outside of the magnet 600 and the weight has the same resonance frequency as a the frequency of power applied to the first coil member 310 and the second coil member 320 together with the magnet 600, and the weight translates in the vertical direction together with the magnet 600 when a current is applied to the first coil member 310 and the second coil member 320, thereby generating vibration.

Further, the magnet 600 and the weight 700 is elastically supported within the case 100 by the first elastic member 810.

Specifically, the first elastic member 810 is a leaf spring which is made of a first fixed portion 800a having a ring shape, a second fixed portion 800b which has a larger diameter than that of the first fixed portion 800a, and a spiral leg portion 800c connecting the first fixed portion 800a with the second fixed portion 800b.

The leg portion 800c has 4 parts and has spiral shape.

Naturally, shape and number of the leg portion 800c can be changed variously in some cases.

An end of the first elastic member 810, i.e., the first fixed portion 800a is fixed at upper ends of the magnet 600 and the weight 700 and an opposite end thereof, i.e., the second fixed portion 800b is fixed at an upper of the case 100, i.e., the cover 120.

The first elastic member 810 adds elastic force to the magnet 600 and the weight 700 in the vertical direction, thereby facilitating the vertical translation of the magnet 600 and the weight 700.

The second elastic member 820 has the same shape as the first elastic member 810, wherein the first fixed portion 800a is fixed at lower ends of the magnet 600 and the weight 700 and the second fixed portion 800b is fixed at the bottom plate 110.

The second elastic member 820 adds elastic force to the weight 700 and the magnet 600 like the first elastic member 810, thereby facilitating the vertical translation of the magnet 600 and the weight 700.

Meanwhile, the first cushion member 910 and the second cushion member 920 are made of elastic rubber material and has a circular ring shape, wherein the inner diameters of the first cushion member 910 and the second cushion member 920 are greater than that of the magnet 600 and the outer diameters of the first cushion member 910 and the second cushion member 920 are smaller than that of the weight 700.

Further, the first cushion member 910 is arranged inside of the accommodation space 100a and is fixed at an upper of the cover 120, and the second cushion member 920 is placed inside of the accommodation space 100a and is fixed at the bottom plate 110.

The first cushion member 910 and the second cushion member 920 collide each other and produce a repulsive power when the magnet 600 and the weight 700 translates in the vertical direction, thereby increasing vibration acceleration.

Further, the first cushion member 910 and the second cushion member 920 reduce the generation of noise by playing a role as a sound-absorbing material at the time of collision of the magnet 600 and the weight 700.

The operation process of the haptic actuator according to an embodiment of the present invention as described above is explained.

First, at the initial state, i.e., before current is applied to the first coil member 310 and the second coil member 320, as shown in FIG. 4, a magnetic force lines which move from an upper of the magnet 600 via the first auxiliary yoke 510, the core 200 and the second auxiliary yoke 520 to a lower of the magnet 600 is formed.

As shown in FIG. 5, if power is applied in the direction of from the first coil member 310 to the second coil member 320, around the second coil member 320 a magnetic pole is formed in order for South pole to be placed in a direction toward the center yoke 400, and the magnetic force lines which move from the lower of the second coil member 320, via the second auxiliary yoke 520, the magnet 600, the center yoke 400 to the core 200 are formed.

By interaction of such a magnetic force lines the magnet 600 moves to the lower direction.

On the contrary, as shown in FIG. 6, if power is applied in the direction of from the second coil member 320 to the first coil member 310, around the first coil member 310, a magnetic pole is formed in order for North pole to be placed in a direction toward the center yoke 400, and the magnetic force lines which move along the lower of the first coil member 310, the core 200, the center yoke 400 and the first auxiliary yoke 510 are formed, as a result, the magnet 600 moves to the upper direction.

By such a vertical movement, if a sign wave of a predetermined frequency band is applied to the first coil member 310 and the second coil member 320, a vibration is generated while the magnet 600 and the weight 700 translates in the vertical direction.

Meanwhile, a haptic actuator according to an embodiment of the present invention, as an arrow direction shown in FIG. 4, a magnetic force lines of closed-loop structure are formed between the first coil member 310, the second coil member 320 and the magnet 600.

By such a structure of magnetic force lines and the first elastic member 810 and the second elastic member 820, the magnet 600 and the weight 700 become a negative stiffness state at the time of vibration.

In other words, when power is applied to the first coil member 310 and the second coil member 320, as shown in FIG. 8, it becomes in the predetermined region of vertical displacement distance (mm) of the magnet 600 a stable state that the difference of a magnetic force (N) being generated in the magnet 600 from elastic force of the first elastic member 810 and the second elastic member 820 is less than +/−1.

Further, by a structure of such a magnetic force lines, the magnet 600 produces the power toward the center yoke 200.

As such, if the magnet 600 becomes a negative stiffness state, then the damping value of the magnet 600 increases, thereby generating an effect that the response speed which the magnet 600 vibrates is faster.

In this case, as a result of measurement of the response speed of a haptic actuator of the present invention and a vibrating motor of the prior art, while the response speed of the vibrating motor of the prior art is about 27.5 ms, the response speed of the haptic actuator according to an embodiment of the present invention is about 5.5 ms.

Further, as shown in FIG. 7, the range of the response frequency of the haptic actuator T2 according to an embodiment of the present invention is wider than that of the vibration motor of the prior art.

Specifically, FIG. 7 is a graph comparing and measuring acceleration of the haptic actuator T2 of the present invention and the vibration motor T1 of the prior art according to the frequency of power applied to the first coil member 310 and the second coil member 320, when based on 1 G, in the case of the haptic actuator T2 of the present invention, the range of the response frequency is about 170 Hz, whereas in the case of the vibration motor T1 of the prior art, the range of the response frequency is about 20 to 30 Hz.

As such, a haptic actuator according to an embodiment of the present invention is improved the performance in frequency band, etc, and its response speed is faster than that of the prior art by the structure of the magnetic field formed by the magnet 600, the core 200, the center yoke 400, the first auxiliary yoke 510 and the second auxiliary yoke 520.

Further, by being the response speed of the haptic actuator faster, the output corresponding to various pattern of input signal in the portable terminal to which the haptic actuator is employed is promptly generated and transferred, thereby its quality and performance is improved.

INDUSTRIAL APPLICABILITY

While the present invention has been described with respect to the specific embodiments, it will be apparent to those skilled in the art that various changes and modifications may be made without departing from the spirit and scope of the invention as defined in the following claims.

The invention claimed is:

1. A haptic actuator, comprising:
   a case having an accommodation space therein;
   a cylindrical core fixedly mounted inside the accommodation space;
   a center yoke formed around an outer circumferential surface of the cylindrical yoke at a vertical center portion of the cylindrical yoke;
   a first auxiliary yoke formed around an outer circumferential surface of the cylindrical yoke at a vertical top end portion of the cylindrical yoke;
   a second auxiliary yoke formed around an outer circumferential surface of the cylindrical yoke at a vertical bottom end portion of the cylindrical yoke;
   a first coil member mounted around an outer circumferential surface of the cylindrical yoke between the first auxiliary yoke and the center yoke and a second coil member mounted around an outer circumferential surface of the cylindrical yoke between the second auxiliary yoke and the center yoke, the first and second coil members being vertically spaced apart each other by the center yoke, wherein the first coil member is configured to magnetize the first auxiliary yoke and the center yoke, and the second coil member is configured to magnetize the second auxiliary yoke and the center yoke;
   a magnet disposed adjacent to the center yoke with an air-gap in-between;
   a weight fixed to the magnet;
   a first elastic member having an end fixed to the magnet and the weight, and an opposite end fixed to an upper inner side of the case and elastically supporting the magnet and the weight.

2. The haptic actuator of claim 1,
   wherein the first coil member and the second coil member are wound in opposite directions to each other, and
   wherein the magnet has polarity formed in a vertical direction and thickness being thicker than that of the center yoke.

3. The haptic actuator of claim 1,
   wherein the first auxiliary yoke and the second auxiliary yoke have a thickness thinner than that of the center yoke.

4. The haptic actuator of claim 1, further comprising:
   a first cushion member disposed in the accommodation space and fixedly mounted on an upper inner side of the case; and
   a second cushion member disposed in the accommodation space and fixedly mounted on a lower inner side of the case.

5. The haptic actuator of claim 1, further comprising:
   a second elastic member having an end fixed to the magnet and the weight and an opposite end fixed to a lower inner side of the case and elastically supporting the magnet and the weight.

6. The haptic actuator of claim 1,
   wherein the magnet and the weight has a ring shape.

* * * * *